United States Patent [19]

Kim et al.

[11] Patent Number: 5,653,234
[45] Date of Patent: Aug. 5, 1997

[54] METHOD AND APPARATUS FOR ADAPTIVE SPATIAL IMAGE FILTERING

[75] Inventors: Jin Kim, Issaquah; Steven R. Marquis, Fall City; Zoran Banjanin, Renton; Dong-Chyuan Liu, Mercer Island, all of Wash.

[73] Assignee: Siemens Medical Systems, Inc., Iselin, N.J.

[21] Appl. No.: 536,417

[22] Filed: Sep. 29, 1995

[51] Int. Cl.$^6$ ............................................. A61B 8/00
[52] U.S. Cl. ........................ 128/660.01; 128/661.09; 382/264
[58] Field of Search ................... 128/660.07, 660.01, 128/661.09; 348/701; 382/264

[56] References Cited

U.S. PATENT DOCUMENTS

| | | | |
|---|---|---|---|
| 4,556,067 | 12/1985 | Hokanson et al. | 128/662.01 |
| 4,608,993 | 9/1986 | Albert | 73/861.25 X |
| 4,783,839 | 11/1988 | Bomber | 382/54 |
| 4,800,891 | 1/1989 | Kim | 128/661.99 |
| 4,887,306 | 12/1989 | Hwang et al. | 382/264 |
| 4,970,637 | 11/1990 | Sato | 364/413.25 X |
| 5,050,220 | 9/1991 | Collet-Billon | 364/413.25 X |
| 5,343,309 | 8/1994 | Roetling | 358/455 |
| 5,479,926 | 1/1996 | Ustuner et al. | 128/660.04 |
| 5,544,659 | 8/1996 | Banjanin | 128/661.09 |

*Primary Examiner*—Francis Jaworski

[57] ABSTRACT

An apparatus and method for removing noise from a signal $S(x)$. The noise is removed by filtering $S(x)$ through a low pass filter having an adjustable pass band. A control processor analyzes $S(x)$ prior to $S(x)$ being input to the low pass filter and adjusts the pass band in response to an estimate of the SNR or rate of change of $S(x)$ such that the pass band is reduced when the estimated SNR decreases and the pass band is increased when the SNR increases. In embodiments in which the control processor utilizes the rate of change of $S(x)$ to control the pass band, the pass band is reduced when the rate of change of $S(x)$ increases and increased when the rate of change of $S(x)$ decreases. In embodiments used in ultrasound applications, the estimate of the SNR can be obtained from x, the power in $S(x)$, or the variance in the measured velocity. The estimate of the rate of change of $S(x)$ may be computed from an estimate of the correlation distance in $S(x)$.

10 Claims, 2 Drawing Sheets

METHOD AND APPARATUS FOR ADAPTIVE SPATIAL IMAGE FILTERING

FIELD OF THE INVENTION

The present invention relates to systems which reduce the noise in an image by applying a filter to the image and, more particularly, to filters for improving the signal-to-noise ratio (SNR) in ultrasound generated images and other applications in which the noise level changes over the course of the signal.

BACKGROUND OF THE INVENTION

Ultrasound imaging is an attractive modality for numerous diagnostic procedures because of its non-invasive nature, relatively low cost, and lack of radiation exposure. Medical ultrasound images are typically produced by generating an ultrasonic sound wave traveling in a known direction and observing the echoes created when the sound wave bounces off of boundaries between regions of differing density in the body. For any given direction, the image pixels are generated by plotting a dot whose brightness is proportional to the echo's amplitude at a coordinate whose location is a function of the time after the short sound pulse is send in the direction of the scan line being measured.

In addition to providing images of the body, ultrasound may also be used for measuring the flow of blood. Measurements related to the velocity of blood at each point in the image are useful in the diagnosis of arterial disease and general blood flow. For example, after transplant surgery, blood flow measurements may be used to ascertain if the transplanted organ is properly functioning. Similarly, by measuring the turbulence associated with the blood flow, arterial blockages and certain heart valve abnormalities may be detected.

The velocity measurements may be determined by measuring the Doppler shift of the ultrasound pulse reflected from the moving blood. It can be shown that the velocity and variance of the velocity may be obtained from an autocorrelation function based on the measured ultrasound intensities. Denote the autocorrelation function by $R(t,x)$, where x represents the depth along the scan line, and t represents the time at which the scan was taken. $R(t,x)$ is typically computed by averaging N scans taken at successive time points in the same direction according to the relationship:

$$R(t, x) = \frac{1}{N} \sum_{n=1}^{N} z(t_n, x) Z^*(t_{n-1}, x) \tag{1}$$

where the superscript "*" denotes the complex conjugate. Here, x represents the depth along the scan direction and z(t,x) represents the complex amplitude of the return echo from depth x. The complex function z(t,x) is obtained by modulating the return echo signal with sine and cosine functions to obtain the in phase and quadrature components of the echo signal.

In blood measurements, the phase of $R(t,x)$ provides the velocity of the blood flow while the variance, $\sigma^2$, in the velocity provides an estimation of the turbulence. The variance may be estimated from $R(t,x)$, i.e., $$\sigma^2 \approx 1 - \frac{|R(t, x)|}{R(0, x)} \tag{2}$$

While ultrasound has a number of advantages over other measurement modalities, it suffers from noise problems that make the measurements difficult to interpret without some form of noise reduction. This noise results from noise in the receiver and from the individual sound scattering centers which are moving during the image acquisition process. While the averaging in the time domain shown in Eq. (1) helps to reduce the effects of this noise, the averaging by itself is often insufficient to provide the accuracy needed for velocity measurements.

Spatial averaging filters have been used to improve the SNR in ultrasound images. The averaging operation combines a number of adjacent measurements in x to generate one averaged signal. In normal imaging, as opposed to the flow measurements described above, the spatially averaged image, $z'(t,x)$ is obtained by computing the weighted average of $z(t,x)$ at a number of points around x.

$$z'(t, x_k) = \sum_{i=1}^{M} w_i z(t, x_{k-i+M/2}) \tag{3}$$

Here, the $w_k$ are weights used in the averaging, and $x_k$ is the digitized depth for the scan. The specific averaging algorithm depends on the choice of weights and the number of points averaged. While larger numbers of points provide a smoother image and higher effective SNR, the resultant image is blurred. The degree of blurring increases with the number of points. Hence, the spatial averaging represents a tradeoff between spatial resolution and SNR.

The same procedure can, in principle, be applied to the autocorrelation function $R(t,x)$ to obtain an average autocorrelation function, $R'(t,x)$, i.e., $$R'(t, x_k) = \frac{1}{N} \sum_{i=1}^{M} \sum_{n=1}^{N} w_i z(t_n, x_{k-i+M/2}) z^*(t_{n-1}, x_{k-i+M/2}) \tag{4}$$

where, the superscript "*" again denotes the complex conjugate. Again, the specific averaging algorithm depends on the choice of weights and the number of points averaged. While larger numbers of points provide a higher effective SNR, the resolution of the resultant velocity measurement is decreased. The loss in resolution increases with the number of points. Hence, the spatial averaging of the autocorrelation function also represents a tradeoff between resolution and SNR.

Prior art filtering techniques attempt to find a compromise filter length that provides satisfactory results over the entire image. Unfortunately, in ultrasound imaging, the SNR varies markedly over the image; hence, any single filter configuration is less than optimum for all locations in the image. In general, the SNR decreases with depth of the echo generating structure in the body. Echoes from deep tissue boundaries have much poorer SNRs than echoes from tissue boundaries near the transducer and receiver. Hence, a filter that provides satisfactory SNRs for the deep tissue portions of the scan will, in general, result in unnecessary blurring of the near tissue portion of the scan.

Broadly, it is the object of the present invention to provide an improved noise reduction filtering system for ultrasound measurements.

It is another object of the present invention to provide an improved noise reduction system that provides improved SNR during velocity measurements.

It is a further object of the present invention to provide a noise reduction filter having a length and/or weights that change in response to the signal SNR.

These and other objects of the present invention will become apparent to those skilled in the art from the following detailed description of the invention and the accompanying drawings.

SUMMARY OF THE INVENTION

The present invention comprises an apparatus and method for removing noise from a signal S(x). In ultrasound applications, S(x) may be either the autocorrelation function used to compute velocity or the amplitude of the returned echo in normal imaging applications. The noise is removed by filtering S(x) through a low pass filter having an adjustable pass band. A control processor analyzes S(x) prior to S(x) being input to the low pass filter and adjusts the pass band in response to an estimate of the SNR or rate of change of S(x) such that the pass band is reduced when the estimated SNR decreases and the pass band is increased when the SNR increases. In embodiments in which the control processor utilizes the rate of change of S(x) to control the pass band, the pass band is reduced when the absolute value of the rate of change of S(x) increases and increased when the absolute value of the rate of change of S(x) decreases. In embodiments used in ultrasound applications, the estimate of the SNR can be obtained from x, the power in S(x), or the variance in the measured velocity. In applications involving velocity measurements, the estimate of the rate of change of S(x) may be computed from an estimate of the correlation distance in (the autocorrelation function. In embodiments in which the control processors utilizes x or the power in the signal as a function of x, p(x), the pass band is reduced when P(x) decreases and/or x increases. The precise control strategy depends on whether the SNR correlates better to P(x) or x.

DETAILED DESCRIPTION OF THE INVENTION

Figure 1:
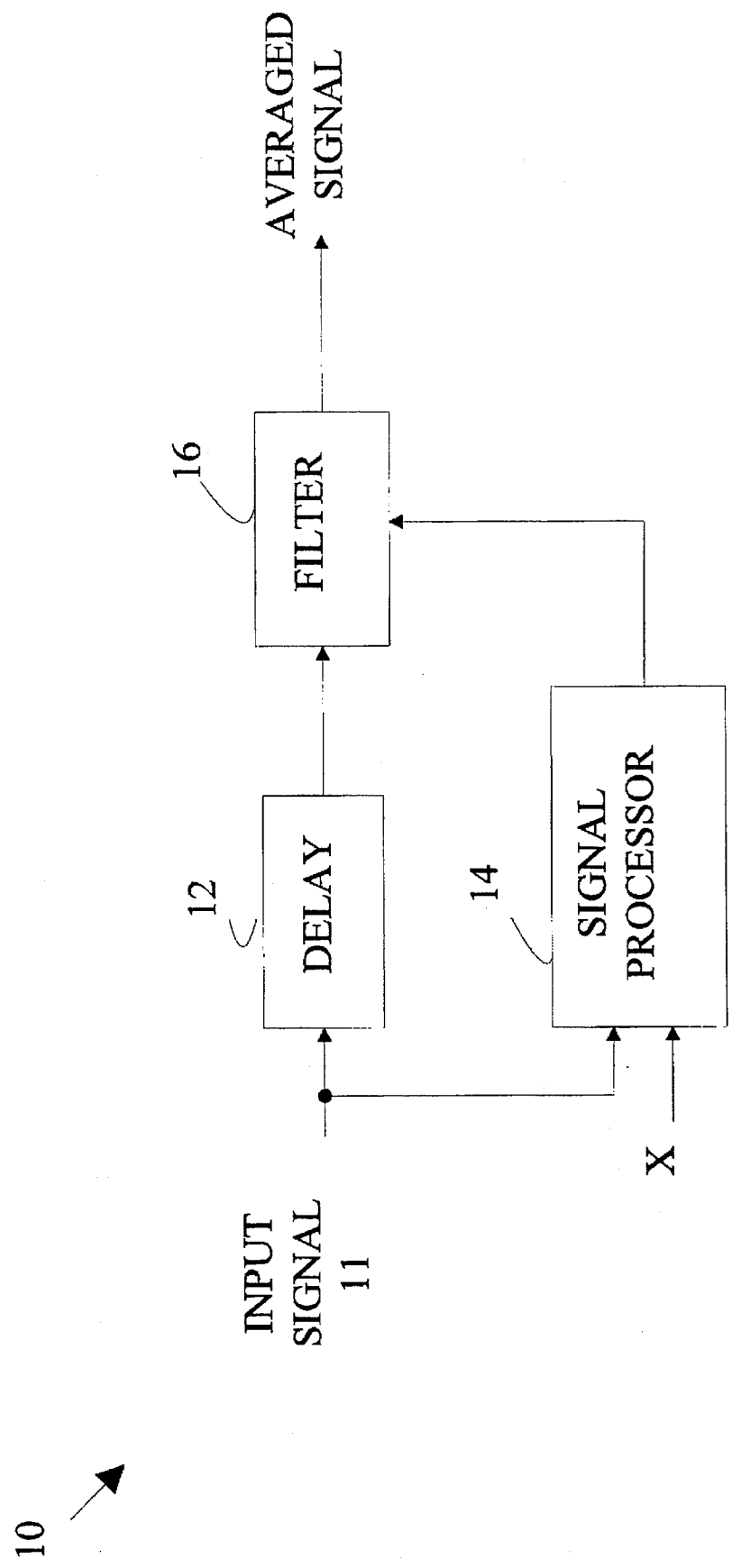
FIG. 1 which is a block diagram of signal filtering circuit 10 according to the present invention.

The present invention may be more easily understood with reference to FIG. 1 which is a block diagram of signal filtering circuit 10 according to the present invention. The input signal 11 is assumed to be a function of x. In the case of an ultrasound system the input signal may be the autocorrelation signal discussed above, the complex image signal z, or the amplitude of the echo as a function of the distance, x, from the transducer. Input signal 11 is to be averaged in x by filter circuit 16 which is preferably a finite impulse response filter (FIR). The weights, $w_k$, and number of taps M utilized by filter 16 are controlled by signal processor 14 which receives the input signal prior to the signal reaching filter 16. Delay circuit 12 provides the required delay.

Signal processor 14 may use any function of the input signal that correlates with the SNR of input signal 11 to determine the filter parameters. The filter parameters are set such that signals that have higher SNRs are subjected to less spatial averaging than signals having lower SNRs. In the case of an ultrasound a number of functions may be utilized. As noted above, the SNR of ultrasound signals decreases with x; hence, processor 14 can use the depth signal which is generated elsewhere in the ultrasound apparatus.

The power of the input signal may also be used as proxy for the SNR, since signals having higher power, in general, have higher signal to noise ratios. Thee power of the signal z(t,x) is defined by $$P(x) = \sum_{n=1}^{N} |z(t_n, x)|^2 \quad (5)$$

Another method for setting the length, M, of the FIR filter is to examine the correlation distance in the input signal. In general, one wishes to use the largest M value that will not degrade the underlying signal. If the velocity being measured changes significantly over the averaging interval, then the averaging operation will decrease the accuracy of the velocity being measured. Two methods for adjusting M based on the change in velocity may be utilized. The first utilizes the measured variance to adjust the window size. In this method, an experimentally determined table of M versus $\sigma^2$ is used to set M.

The second method measures the correlation distance. The correlation distance may be estimated by measuring the sum of the absolute difference, SAD, of the signal in two sequential windows. Define the real part of $z(t,x_1)$ to be $P_1(t)$, and $P_2(t)$ to be the real part of $z(t,x_2)$. Here, $x_1$ and $x_2$ are two points that are close on the same scan line. In the preferred embodiment of the present invention, $x_1$ and $x_2$ are adjacent pixels on the scan line. It is assumed that K successive scans are made along the scan line at times $t_1, \ldots, t_K$. The correlation between $P_1$ and $P_2$ can be estimated by computing the sum of the absolute value of the differences, SAD, of these to time functions at various time shifts, $\tau$, such that the absolute value of $\tau \leq \Delta T$. In particular, the minimum value of the $SAD(\tau)$ is an estimate of the correlation of the signals. Here, $$SAD(\tau) = \frac{1}{K} \sum_i |P_1(i) - P_2(i+\tau)| \quad (6)$$

Denote the minimum value of $SAD(\tau)$ by MSAD. The smaller the value of MSAD, the higher the correlation between the two signals. A high degree of correlation indicates that the signals are changing slowly, and hence, more points can be averaged in the spatial domain. Similarly, a low degree of correlation indicates that the signal is changing rapidly, and hence, only a small number of points may be averaged in the spatial domain without blurring the image or velocity measurement. Hence, M can be set with reference to MSAD once a calibration is established for any particular instrument. Typically, three or four M values are chosen. The measured value of MSAD is then used to select the appropriate value.

In the preferred embodiment of the present invention, all of the weights in the FIR filter are taken to be the same. This corresponds to a "boxcar" averaging system. This filter is preferred because of its ease of implementation and because there is no reason to believe that the data points should be non-uniformly weighted. In this type of filter, each signal value is replaced by the average of the M signal values around that signal value. As each new signal value is received it is shifted into an M place shift register and added to a running sum. The value shifted off of the shift register is subtracted from the running sum. If M is restricted to a power of two, the averaged signal may be obtained by shifting the sum in the adder by $\log_2 M$ bits; hence, no division is required. In this case, signal processor 14 need only supply the length of the FIR filter to filter 16 shown in FIG. 1.

Figure 2:
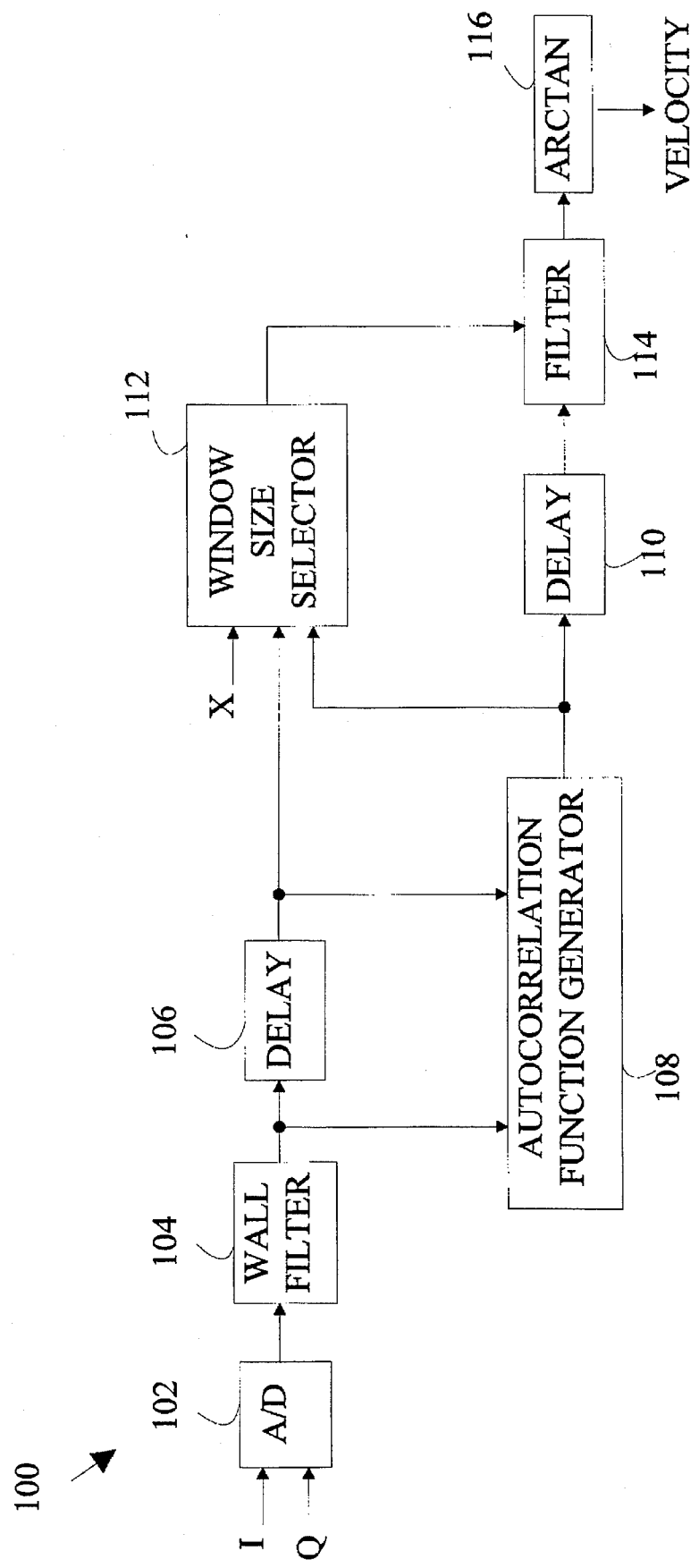
FIG. 2 is a block diagram of a blood velocity measuring circuit according to the present invention.

An embodiment of the present invention for computing velocity as a function of x for blood flow measurements is shown in FIG. 2 at 100. Apparatus 100 receives the in phase and quadrature outputs, I and Q, from the ultrasound transducer processing circuitry. The I and Q values are digitized by A/D converter 102 which generates the complex signal z(t,x) discussed above. The output of the A/D converter is filtered by a "wall filter" 104 which removes motion artifacts resulting from the motion of the "walls" in the patient's body. These gross motion artifacts interfere with blood velocity measurements. Since such filters are conventional in the ultrasound arts, they will not be discussed in detail here.

The output of the wall filter is input to an autocorrelation generator 108. The output of the previous scan in the same direction is also presented to autocorrelation generator 108 with the aid of a delay circuit 106. Autocorrelation generator 108 generates the function R shown in Eq. (1). This function is input to size selector 112 which determines the size of the averaging window used by filter 114. As noted above, the size of the window may be determined from the z(t,x), and/or R(t,x). Z(t,x) provides information about the correlation length, and power, while R(t,x) provides the information needed to compute the variance of the velocity. In addition, as noted above, the size of the window may be determined from the depth of the scan, x, in some cases. A delay circuit 110 is used to delay the autocorrelation generator output long enough for window size selector 112 to determine the proper filter length for filter 114. The output of filter 114 is input to an arctangent circuit 116 which computes the phase of the filtered autocorrelation signal, and hence the velocity.

While the above described embodiments of the present invention have been described in terms of an FIR filter implementation of filter 16, it will be apparent to those skilled in the art that any low pass filter having a pass band that can be adjusted by signal processor 14 may be utilized. Signal processor 14 decreases the pass band when the signal has a low SNR and increases the pass band when the SNR increases.

While the above described embodiments of the present invention have been described in terms of ultrasound imaging systems, it will be apparent to those skilled in the art that the noise reduction filter of the present invention may be used to improve the SNR of any signal S(x) whose SNR varies with x in a manner that can be estimated from S(y) for y values less than or equal to x.

Various modifications to the present invention will become apparent to those skilled in the art from the foregoing description and accompanying drawings. Accordingly, the present invention is to be limited solely by the scope of the following claims.

What is claimed is:

1. An ultrasonic imaging apparatus for removing noise from a received ultrasonic imaging signal S(x) when x is a function of imaging depth, said apparatus comprising:

a low pass filter having the received ultrasonic signal S(x) as input and having an adjustable pass band, and a control processor for generating a control signal as a signal-to-noise ratio estimation signal as a predetermined function of S(x) and for adjusting the adjustable pass band using said control signal prior to said imaging signal passing through said low pass filter such that said pass band is reduced when said estimated signal-to-noise-ratio decreases and said pass band is increased when said signal-to-noise ratio increases.

2. The apparatus of claim 1, wherein said control processor generates said signal-to-noise ratio estimation signal as a predetermined function of power of S(x).

3. The apparatus of claim 1, wherein said control processor estimates a correlation distance for the received ultrasonic signal S(x), and includes means for estimating a rate of change of the absolute value of S(x) as a function of the correlation distance, and for generating the signal-to-noise ratio estimation signal as a predetermined function of the rate of change of the absolute value of S(x).

4. The apparatus of claim 1, wherein said control processor generates said signal-to-noise-ratio estimation signal as a predetermined function of the variance of S(x).

5. A method for operating an ultrasonic imaging apparatus for removing noise from a received ultrasonic imaging signal S(x) when x is a function of imaging depth, said method comprising the steps of:

low pass filtering the received ultrasonic signal through an adjustable pass band filter, generating a control signal as a signal-to-noise ratio estimation signal as a predetermined function of S(x), and adjusting the adjustable pass band using said control signal prior to said imaging signal passing through said low pass filter such that said pass band is reduced when said estimated signal-to-noise ratio decreases and said pass band is increased when said signal-to-noise ratio increases.

6. The method of claim 5, wherein said control signal generating step comprises generating said signal-to-noise ratio estimation signal as a predetermined function of power of S(x).

7. The method of claim 5, wherein said control signal generating step comprises estimating a correlation distance for the received ultrasonic signal S(x), estimating a rate of change of the absolute value of S(x) as a function of the correlation distance, and generating the signal-to-noise ratio estimation signal as a predetermined function of the rate of change of the absolute value of S(x).

8. The method of claim 5, wherein said generating step comprises generating said signal-to-noise ratio estimation signal as a predetermined function of the variance of S(x).

9. The apparatus of claim 1, wherein said control processor generates said signal-to-noise ratio estimation signal as a function of the rate of change of the absolute value of S(x).

10. The method of claim 5, wherein said control signal generating step comprises generating said signal-to-noise ratio estimation signal as a predetermined function of the rate of change of the absolute value of S(x).

* * * * *